J. R. ROSE.
PROCESS OF CUTTING METAL.
APPLICATION FILED DEC. 9, 1915.
1,242,243.
Patented Oct. 9, 1917.
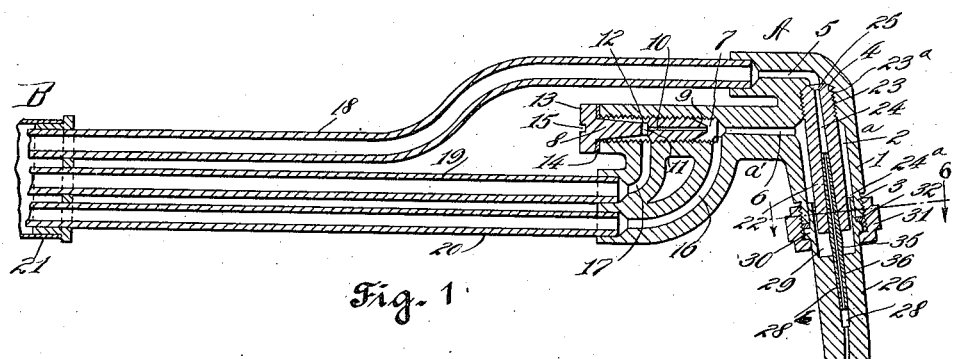

though the branch of the head.

UNITED STATES PATENT OFFICE.

JAMES R. ROSE, OF EDGEWORTH, PENNSYLVANIA.

PROCESS OF CUTTING METAL.

1,242,243.　　　　Specification of Letters Patent.　　　Patented Oct. 9, 1917.

Original application filed July 15, 1915, Serial No. 39,936. Divided and this application filed December 9, 1915. Serial No. 65,955.

*To all whom it may concern:*

Be it known that I, JAMES R. ROSE, a citizen of the United States, residing at Edgeworth, in the county of Allegheny and State of Pennsylvania, have invented a certain new and useful Improvement in Processes of Cutting Metal, of which the following is a full, clear, and exact description, reference being had to the accompanying drawings.

This invention relates to a process whereby metal may be cut by means of oxygen. The use of oxygen for the purpose of cutting metal which has been preheated has been employed for many years, the cutting being performed either by supplying an excess of oxygen to a flame produced by the combustion of a mixture of oxygen with some other combustible gas or by directing a separate jet of oxygen against metal which has been so preheated. In the art, as it existed prior to my invention, it has been found practically impossible to limit the zone of action of the cutting jet. This has been particularly true where attempts have been made to cut projections from a metal body or plate without injuring the body or plate and without leaving burs or projections above the same. By my process I am enabled to remove such projections as rivet-heads protruding from the surfaces of boiler plates, steel cars, and the like, without cutting or digging into the bodies of the plates on the one hand and without leaving the burs or projections which heretofore have resulted from the attempts to avoid such cutting or digging.

In realizing my invention I prefer to use a torch or blow-pipe such as shown in the drawings hereto annexed, wherein Figure 1 is a longitudinal sectional view taken through the blow-pipe or torch proper and the tubes leading thereto; Fig. 2 is a longitudinal sectional view taken through the lower member of the tip, along the line 2—2 of Fig. 4; Fig. 3 is a longitudinal sectional view corresponding to the line 3—3 of Fig. 2; Fig. 4 is a bottom plan view of the tip of the blow-pipe or torch; Fig. 5 is a side elevation of my torch illustrating the manner in which it operates in connection with the cutting or removing of rivet heads from plates; and Fig. 6 a sectional view corresponding to the line 6—6 of Fig. 1.

Describing by reference characters the various parts illustrated in the drawings, A denotes the head of a blow-pipe or torch and B the handle therefor. The head A comprises a body provided with two branches $a$ and $a'$ extending at an angle to each other. The branch $a$, in the operation of the torch or blow-pipe, extends toward the article to be cut while the branch $a'$ extends at nearly right angles from the branch $a$. For convenience of description, it will be assumed that the plate from which the projections are to be cut is located below a blow-pipe or torch, and the terms "top" and "bottom" will be used accordingly. The branch $a$ of the head comprises an annular shell 1 having a chamber 2 extending upwardly from the lower end thereof and provided at such lower end with a threaded reduced portion 3. The upper end of the chamber 2 is contracted and provided with an internally threaded portion and with a conical seat 4 above such threaded portion, said conical seat being provided with an opening therethrough registering with a passageway 5 which is provided in the branch $a'$ of the head.

The branch $a'$ (with the parts arranged as shown in the drawing) has the passageway 5 therein and a passage way 6 extending to and communicating with the upper portion of the chamber 2. The rear end of the passageway 6 communicates with the chamber 7, which is internally threaded for the reception of a plug 8 having a nozzle 9 at the front end thereof and a reduced bore 10 extending from the front end to a transverse bore 11 which communicates at its opposite ends with a recess in the plug forming, with the wall of the chamber 7 an annular receiving chamber 12. The rear or outer end of the plug 8 is provided with a head 13, suitable packing material 14 being interposed between said head and the adjacent portion of the branch $a'$. For convenience of manipulation, the plug 8 is provided with a slit 15 which is adapted to receive a screw-driver. The front end of the chamber 7, in front of the nozzle 9, is provided with a passageway 16 extending downwardly and rearwardly, and a passageway 17 extends in like manner from the chamber formed about the recess 12.

A tube 18 extends rearwardly from the passageway 5 and conducts oxygen to the passageway 5. A tube 19 extends rearwardly from the passageway 17 and serves to conduct oxygen thereto, while a tube 20 extends rearwardly from the passageway 16 and serves to conduct a suitable combustible gas thereto. The tubes 18, 19 and 20 extend to a common casing 21 constituting the handle proper, the tubes being provided with proper controlling valves whereby oxygen and a combustible gas may be supplied to the passageways 16 and 17 to produce one or more preheating jets, while oxygen may be supplied, when desired, through the tube 18 (and the tip to be described hereinafter) to the preheated metal.

Coöperating with the head and with the pipes and valve thus referred to is a special tip which is peculiarly adapted, in connection with the head and the gas-supplying devices, to realize my process. The tip comprises generally an inner and an outer member or section which, although detachably connected together, constitute in effect a single tip. The upper member consists of a cylindrical body 22 having its upper portion threaded, as shown at 23, and provided with a tapered or frusto-conical end 23$^a$, which threaded portion and end coöperate with the threaded portion of the shell 1 and the tapered seat 4. The body 22 is provided with a central passageway 24, the upper end whereof is enlarged, as shown at 25, whereby it substantially registers with the discharge end of the passageway 5. The lower end of the member 22 extends somewhat below the lower end of the shell 1 and has its opposite sides flattened, as shown at 26, for the reception of a tool whereby the upper tip body may be conveniently applied to and removed from its seat within the burner shell or head. The lower or outer member of the tip comprises a body 26 the lower portion 27 whereof is bent or deflected so as to form an angle with the portion 26. The body is provided with a central bore comprising an upper enlarged passageway 28 and a lower restricted passageway 28$^a$, the body being bored first and afterward bent to the angular shape shown in the drawing. The passageway 28 communicates at its upper end with an enlarged chamber 29 within the upper part of the body 26, and this chamber is provided with an outwardly projecting flange 30 below the top of the tip body. This flange provides means whereby this body may be secured to the lower end of the annular shell 1, said means being shown as comprising a gland nut 31 having a flange extending beneath the flange 30, said nut being applied to the threaded end 3 of the shell 1. Packing 32 may be inserted between the flange 30 and the bottom of said shell wall.

It will be observed that the chamber 29 is of sufficient greater diameter than the diameter of the body 22 to provide, between the lower end of said body and the chamber, an annular passageway for the mixture of oxygen and combustible gas which is to supply the preheating jet or jets. In assembling, it may happen that the lower end of the body 22 will not be centered with respect to the upper body 26, thus interfering with the supply of oxygen and combustible gas to the chamber 29. To prevent such interference with the gas supply, I provide the inner wall of the chamber 29 with a plurality of vertically extending scores or recesses 33. In Fig. 6, I have shown four such recesses, two of which may constitute extensions of passageways extending through the tip section 26 on each side of the central passageway 28$^a$. It will be observed that the passageway 28$^a$ is centrally arranged with respect to the body 26 in one plane, but that it is so deflected in another plane that its discharge end is closely adjacent to one edge 34 of the tip end, the tip end being shown as rectangular. In fact, the discharge end of the oxygen passageway will be located as close as possible to this edge of the discharge end of the tip. The upper end of the passageway 28 is tapered, as indicated at 28$^b$, and the lower end of the passageway 24 is also tapered, as indicated at 24$^a$. The two tip sections are connected and their bores placed in communication by means of an interposed tubular stem, shown particularly in Fig. 1. This tubular inner stem has a driven, swaged fit within the lower part of the passageway 24 and within the upper part of the passageway 28, being tapered by being enlarged at its center (as shown in an exaggerated degree at 35), and gradually diminishing in cross sectional area on each side of this enlargement, as shown at 36, the tapered portions corresponding to and forming a close driving connection with the corresponding tapered parts 24$^a$ and 28$^b$ of the passageways 24 and 28. This construction enables the two tip sections to be assembled and disassembled and provides a leak-proof connection between their bores.

In forming two of the recesses 33 in the wall of the chamber 29, the drill, after forming such segmental recesses, may be continued into the body of the lower tip section thereby forming a pair of passageways 37. These passageways will preferably be formed in substantially the same plane as the passageway 28$^a$ whereby the outlet or discharge ends of the three passageways 28$^a$ and 37 will be in substantially the same plane—parallel to and as close as possible to the edge 34 of the lower end of the tip section 26. It is an important feature, in carrying out my invention, that the preheating means be employed, not only on each side of the central oxygen jet, but above the plane of such a jet. In order to provide such additional preheating means, each passageway 37 is branched near its lower end whereby branch passageways 37ᵃ extend through the lower end of the tip section 26, the discharge ends of said branch passageways (assuming the torch to be used upon a rivet head or other projection extending upwardly from a plate) being located above the discharge ends of the passageways 37 and in a plane parallel with the plane of the discharge ends of the passageways 28 and 37.

For convenience of manipulation, the lower end of the tip section 26 is beveled gradually away from the edge 34, as shown at 34ᵃ, thereby enabling the tip to be supported with this beveled face resting upon the metal plate and in position to direct the preheating jets discharged through the passageways 37 and the oxygen jet discharged through the passageway 28ᵃ against the rivet head (or other projection) as closely as practically possible to the line of junction between the rivet head and the plate. As previously stated, the boring of the passageways 28ᵃ and 37, 37ᵃ will be accomplished before the bending of the lower tip section 26; and this boring may conveniently be performed by employing two drills for each passageway, the drill for the lower portions of the passageways being smaller than that used in boring the upper portions.

The manner of connecting the tip to the head makes the torch extremely convenient of operation. The upper tip section having been secured in place, the lower section is applied thereto and is turned to whatever direction may be desirable; the tubular stem may be applied to either one of the two tip sections before the assembling operation and inserted into the other tip section when the sections are assembled. The gland nut serves to retain the two parts of the tip in operative relation to each other. If it is desired to change the angle of the lower section with reference to the head, this may be readily accomplished by merely slacking up on the gland nut, turning the lower section to the desired position, and then setting up on the nut.

It will be understood that suitable valves will be provided for supplying a mixture of oxygen and a combustible gas or fluid to the preheating jets, through the pipes 19 and 20, and that a suitable valve will be provided for controlling the supply of oxygen through the pipe 18. In fact the apparatus or blow-pipe disclosed herein is illustrated, described and claimed in my copending application No. 39,936 filed July 15, 1915 of which this application is a division.

In Fig. 5 I have shown the position of the lower section of the tip and of the passageways thereof to the metal plate and to the projection (rivet head) during the cutting operation. By arranging the preheating jets at each side of the oxygen jet and closely adjacent to the face 34ᵃ, the cutting of the rivet or other projection 38 may be accomplished in a plane substantially coincident with the plane of the junction of the projection and the metal plate 39, the torch being moved in the direction of such plane. Using only a pair of preheating jets in the plane of the oxygen jet does not result in softening the metal below the cutting plane, as the preheating thus accomplished is insufficient to secure such result; the upper tier of preheating jets, however, coöperating with the lower tier, serves to soften the metal above this cutting plane, with the result that the yielding or giving of the metal under the action of the oxygen jet will occur above this cutting plane only and within the upper preheated region. I am thus enabled to obtain a clean cut practically coincident with the plane of junction of the projection and the metal plate, and without injury to the parts beneath the cut, the preheating of the metal in the plane above the cutting plane setting up above such cutting plane the conditions necessary to secure this result; in other words, there is provided above the oxygen jet and above the desired cutting line or plane all the softened metal that is necessary to enable the oxygen to perform its cutting operation and without striking down or affecting the metal in the projection or rivet and in the plate beneath such line or plane. This enables me to bring the lower line of openings closer to the bottom of the tip than has heretofore been considered practicable and hence to direct the jets from these openings against the rivet or projection at substantially the junction of the same with the plate.

Having thus described my invention, what I claim is:—

1. The process of cutting metal projections from bodies or plates which consists in directing an oxidizing jet along substantially the plane of junction between the body and the projection and preventing the oxidizing action from extending from the cutting plane in the direction of the body or plate.

2. The process of cutting metal projections from metal bodies or plates which consists in directing an oxidizing jet and one or more ignited preheating jets along substantially the plane of junction of the body or plate and the projection and in limiting the oxidizing action to a zone extending outwardly from such plane, whereby the body or plate will not be oxidized and injured.

3. The process of cutting a metallic projection from a metallic body or plate which consists in directing an oxidizing jet and one or more ignited preheating jets against such projection and in a plane substantially coincident with the junction of said body or plate and such projection and also directing only against such projection one or more ignited heating jets in a plane spaced from the first mentioned plane, whereby the cutting of the metal of the projection will be substantially limited to the space included between said planes and oxidizing and injury of the plate or body will be avoided.

4. The process of cutting a metallic projection from a body or plate which consists in preheating such projection, directing an oxidizing jet along substantially the plane of junction of the projection and the body or plate, and softening the metal of the outer portion only of the projection whereby the cutting performed by the oxygen will not strike inwardly or toward the body or plate.

5. The process of cutting metallic projections from metallic bodies or plates which consists in directing in a plane substantially coincident with the junction of such body or plate and such projection one or more ignited preheating jets and an oxidizing jet, directing only against such metallic projection in a plane outside of and spaced from the first mentioned jet or jets one or more heating jets, and moving the jets along substantially the line of junction of the projection and the body or plate, the direction of movement being in substantially the plane of such jets.

In testimony whereof, I hereunto affix my signature.

JAMES R. ROSE.

Witness:

N. I. McFARLAND.